April 3, 1962   E. A. SILVER   3,028,056
DEVICE HAVING ROLL COVERED WITH SANDPAPER
Filed June 12, 1958
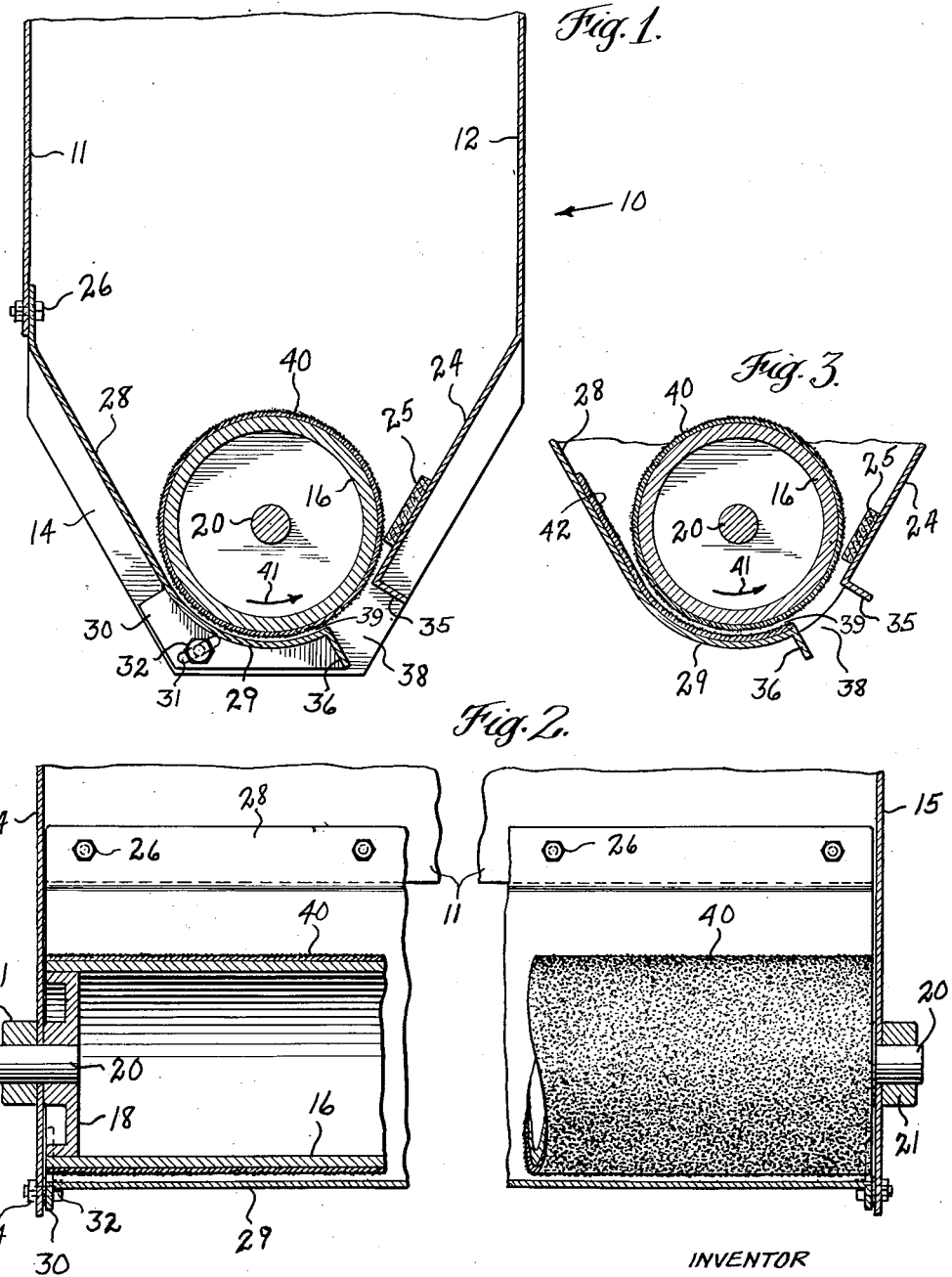
INVENTOR
Edward A. Silver
Joseph Allen Brown
ATTORNEY

United States Patent Office 3,028,056
Patented Apr. 3, 1962

3,028,056
DEVICE HAVING ROLL COVERED
WITH SANDPAPER
Edward A. Silver, Lancaster, Pa., assignor to Sperry Rand Corporation, New Holland, Pa., a corporation of Delaware
Filed June 12, 1958, Ser. No. 741,626
6 Claims. (Cl. 222—312)

The present invention relates generally to seeders, and more particularly to a device for metering bromegrass and other light chaffy seeds at a predetermined rate.

Heretofore, seeding devices have been provided which operate in a highly satisfactory manner in metering relatively hard, easily handled seeds such as alfalfa, clover, oats, wheat and barley. Conventionally, such devices operate on a volumetric principle utilizing the natural ability of the seeds handled to "flow" to secure their proper metering. Seeds which do not "flow" readily are not acceptably metered by such seeders. These seeds include bromegrass, indian grass, rescue grass, orchard grass and prairie grasses in general. Bromegrass, and the like, is difficult to meter with any degree of accuracy because of its fluffy, chaffy, hairy nature. The seeds are extremely light in weight and usually contain many spikelets, a condition not conducive to the volume principle of metering. Because of their physical nature, they have a tendency to bridge and thereby block passage to a volume control device. Bromegrass and some of the other fluffy grasses mentioned constitute species superior to some of the more commonly used grasses. However, their use has been limited by a lack of an efficient distributing device.

A primary object of this invention is to provide a seeding device particularly adapted for metering bromegrass and the like, such device taking advantage of the physical nature of the seeds to secure their metering at a desired predetermined, uniform rate.

Another object of this invention is to provide a seeding device which will seed bromegrass with a positiveness and uniformness heretofore unavailable.

Another object of this invention is to provide a seeding device which will dispense bromegrass and the like with an efficiency comparable or even exceeding seeders adapted to handle the harder, flowable seeds.

A further object of this invention is to accomplish the foregoing objects with a seeder which is of relatively simple construction and has few parts, enabling it to be manufactured, assembled and sold at low cost thereby satisfying a requirement of manufacturer and purchaser alike.

Other objects of this invention will be apparent hereinafter from the specification and from the recital in the appended claims.

In the drawing:

FIG. 1 is a vertical section taken through a seed hopper having a metering device in the bottom thereof constructed according to one embodiment of this invention;

FIG. 2 is a fragmentary section taken generally through the center of FIG. 2 and looking from right to left, part of the metering roll employed being shown in section and part in side elevation; and FIG. 3 is a fragmentary view showing a metering device constructed according to another embodiment of this invention.

Briefly stated, the device of this invention provides means for catching onto spikelets, awns, or covering of seeds to be metered whereby the seeds are conveyed positively and discharged through a suitable outlet in a hopper containing the seeds. Such means comprises a cylindrical roll having an abrasive periphery, the abrasiveness providing a multitude of hard elements or points which catch hold of the seeds and secure their discharge.

Referring now to the drawing by numerals of reference, and particularly FIGS. 1 and 2, 10 denotes generally a hopper adapted to be filled with bromegrass seeds or the like. Hopper 10 has vertical side walls 11 and 12 extending longitudinally, and lateral side walls 14 and 15. Supported in the bottom of hopper 10 is a metering member in the form of a roll 16 rotatable about a longitudinal axis parallel to walls 11 and 12. Each axial end of roll 16 is provided with a disc plate 18 which forms a bearing support for a stub shaft 20. Each stub shaft 20 projects through one of the lateral side walls of the hopper. Suitable support members 21 are provided for each shaft section.

As shown in FIG. 2, the stub shaft 20 at the left end of roll 16 projects outwardly at 22 for connection to a source of power, not shown, the operation of which is controllable whereby the speed of rotation of the roll 16 may be regulated.

As shown in FIG. 1, side wall 12 has a lower portion 24 which converges inwardly toward roll 16. This inwardly projecting lower portion terminates at a point close to the periphery of the roll. A strip 25 of leather, rubber or the like is suitably fastened to the inside of portion 24, as shown, to prevent the escape of seeds between the roll and the wall.

Fastened to side wall 11 by bolts 26 is a downwardly and inwardly inclined wall portion 28 having an arcuate section 29 concentric with the rotational axis of the roll 16. Section 29 encircles roll 16 for a distance slightly less than 90°. Wall 28 is made of a material having some resiliency, such as sheet metal, whereby the wall may be pivoted about its connection 26 with the side wall 11 whereby the arcuate portion 29 may be moved toward or away from the periphery of roll 16. To fasten section 29 in adjusted position, a plate 30 is provided at each axial end of wall portion 28. Each plate 30 extends radially and it is provided with an elongate slot 31. A bolt 32 projects through slot 31 to fasten plate 30 to the adjacent lateral side wall of the hopper. By tightening the nut 34 on bolt 32, section 29 can be locked in adjusted position. Roll 16 cooperates with section 29 to define a narrow discharge passage 39.

Arcuate section 29 of wall 28 constitutes a metering plate, its adjustment toward or away from the roll 16 varying the space therebetween for the passage of seeds.

The lower end of wall 24 has an outwardly projecting flange 35. The lower end of wall 28 has a similar flange 36. These flanges extend longitudinally and define an outlet opening 38.

In accordance with this invention, the periphery of roll 16 is abrasive. The abrasiveness may be provided directly on the roll by roughening its periphery. However, preferably, such abrasiveness is provided by completely covering roll 16 with emery cloth, said paper or the like, denoted 40. The covering of roll 16 should be such as to provide a closed coating, that is, one in which the entire surface of the backing member which carries the abrasive is completely covered with abrasive grains thereby rendering the coating impervious to moisture. It has been found that a range of abrasiveness from about 20 to 120, ranging from relatively coarse to moderately fine, constitutes an acceptable range of abrasiveness. These numbers represent the number of meshes per linear inch in the grading sieve.

When hopper 10 is filled with seeds to be dispensed, and roll 16 rotated as indicated by the arrow 41, the points provided by the grit or abrasive surface on the coating 40 catch onto the spikelets and awns of the seeds. The seeds are thus hooked onto and positively pulled and conveyed by the roll between the arcuate section 29 of plate 28 and the periphery of the metering roll. When these seeds reach the outlet 38, they drop through the discharge opening 38. The considerable coverage of roll 16 by the arcuate section 29 provides for a longer control of the seeds as they are metered from the hopper 10.

With this device, the discharge of seeds is positive. Gravity plays no part in metering the seeds or transferring them from the hopper level to the discharge opening 38. This makes it especially desirable for precision work and the metering of seeds can be closely controlled whereby an appropriate, predetermined amount of seeds can be spread per acre of field.

In the embodiment of the invention shown in FIG. 3 as compared to FIG. 1, like numerals indicate like parts. In addition to relying on the roll 40 for metering the seeds, a closed coating of abrasive 42 is applied to the arcuate portion 29. Thus, when the seeds are discharged they pass between two abrasive surfaces. A more positive control of the seeds is thus made possible, any tendency of the seeds to slide of their own accord being prevented or retarded by the abrasive coating 42.

From the above, it will be seen that the seeding principle employed is completely opposite to the volumetric principle used extensively heretofore. Instead of providing an opening and means for merely controlling the flow of seeds through that opening, applicant provides a positive engagement of spikelets and awns of the seeds and a positive conveyance thereof under controlled conditions to discharge point.

The seeder is able to meter seeds with great precision and uniformity of flow thereby allowing the seeding of light chaffy seeds with great efficiency. The structure is relatively simple and inexpensive to manufacture and assemble. Therefore, the seeder may be manufactured and sold at low cost rendering the machine attractive to purchasers. Further, a farmer is able to select superior species of grasses and utilize them to full advantage, not being limited as heretofore to seeds which could be handled by existing seeding mechanisms.

While this invention has been described in connection with two particular embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

Having thus described my invention, what I claim is:

1. A device for positively and uniformly dispensing bromegrass and like relatively non-fluent, light seeds without grinding or otherwise materially changing the natural condition of the seeds comprising, in combination, a hopper for the seeds, said hopper having spaced wall portions defining a discharge opening, a roll mounted across said discharge opening, said roll substantially closing the opening and providing a space between the roll and one wall portion for the discharge of seeds, said space being of such width that substantially only one layer of seeds may pass through the space at one time, means for rotating said roll in a given direction whereby the periphery of the roll moves toward and then away from said one wall portion, said roll having an unyielding, abrasive, sandpaper periphery providing radially projecting non-elastic points which contact those seeds in the hopper engaging the roll and convey them in said given direction of rotation toward and through said space, the seeds conveyed by said roll have ungrinding passage through said space and said one wall portion preventing flow of other seeds through the space, said roll points being so close together that seeds are unable to pass radially inwardly between adjacent points and the outward projection of the points being slight whereby the spaces between the points are shallow thereby resisting any tendency of chaff from the seeds from depositing in the spaces.

2. A device as recited in claim 1 wherein said wall portion has a seed engageable abrasive sandpaper surface to assist in preventing seeds from passing through said space other than those seeds engaging said roll.

3. A device as recited in claim 1 wherein means is provided for mounting said one wall portion for adjustment radially relative to said roll whereby an adequate and axially uniform space may be provided through which seeds may pass.

4. A device as recited in claim 1 wherein said one wall portion is arcuate and concentric with the axis of the roll whereby said space for the passage of seeds is arcuate.

5. A device as recited in claim 1 wherein said abrasive periphery of said roll comprises a closed, moisture impervious coating, the abrasiveness falling in a range of about 20 to 120.

6. A device for positively and uniformly dispensing bromegrass and like relatively non-fluent, light seeds without grinding or otherwise materially changing the natural condition of the seeds comprising, in combination, a hopper for the seeds, said hopper having spaced bottom wall portions defining a discharge opening, a roll within said hopper and mounted across said discharge opening, said roll substantially closing said opening and providing a space between the roll and one wall portion for the discharge of seeds, said space being of such width that substantially only one layer of seeds may pass through the space at one time, said one wall portion being arcuate and concentric with the axis of the roll whereby said space is arcuate, means mounting said one wall portion for adjustment radially relative to said roll whereby the size of said space may be varied, means for rotating said roll in a given direction whereby the periphery of the roll moves toward and then away from said one wall portion, said roll having an unyielding, abrasive, sandpaper periphery providing radially projecting non-elastic points which contact those seeds in the hopper engaging the roll and convey them toward and through said space, said one wall portion having an abrasive, sandpaper surface which retards movement of seeds through said space other than those seeds in engagement with said roll, the seeds conveyed by the roll have ungrinding passage through said space, said roll points being so close together that seeds are unable to pass radially inwardly between adjacent points and the outward projection of the points being slight whereby the spaces between the points are shallow thereby resisting any tendency of chaff from the seeds from depositing in the spaces, the abrasiveness of the periphery of said roll and said surface of said one wall portion falling in a range of 20 to 120.

References Cited in the file of this patent

UNITED STATES PATENTS

| | | |
|---|---|---|
| 301,020 | Waak et al. | June 24, 1884 |
| 351,483 | Baldwin | Oct. 26, 1886 |
| 615,177 | Holloway | Nov. 29, 1898 |
| 2,635,874 | La Bore | Apr. 21, 1953 |
| 2,643,798 | Neff | June 30, 1953 |